US008234693B2

(12) United States Patent
Stahl et al.

(10) Patent No.: US 8,234,693 B2
(45) Date of Patent: Jul. 31, 2012

(54) SECURE DOCUMENT MANAGEMENT

(75) Inventors: Noah Z. Stahl, St. Petersburg, FL (US);
Wendy S. Bartlett, Seminole, FL (US);
Randall S. Brooks, Apollo Beach, FL (US)

(73) Assignee: Raytheon Company, Waltham, MA (US)

( * ) Notice: Subject to any disclaimer, the term of this patent is extended or adjusted under 35 U.S.C. 154(b) by 900 days.

(21) Appl. No.: 12/334,066

(22) Filed: Dec. 12, 2008

(65) Prior Publication Data

US 2010/0146593 A1    Jun. 10, 2010

Related U.S. Application Data

(60) Provisional application No. 61/120,353, filed on Dec. 5, 2008.

(51) Int. Cl.
G06F 7/04    (2006.01)
(52) U.S. Cl. .................. 726/4; 726/2; 707/783
(58) Field of Classification Search .................. 726/4–7, 726/2, 26–28; 707/E17.008, E17.032, 783, 707/786
See application file for complete search history.

(56) References Cited

U.S. PATENT DOCUMENTS

| 5,982,891 | A | 11/1999 | Ginter et al. ............ 380/4 |
| 2002/0053020 | A1 | 5/2002 | Teijido et al. |
| 2002/0077986 | A1 | 6/2002 | Kobata et al. .......... 705/52 |
| 2005/0240572 | A1 | 10/2005 | Sung et al. |
| 2006/0059567 | A1* | 3/2006 | Bird et al. ............. 726/27 |
| 2006/0200664 | A1* | 9/2006 | Whitehead et al. ...... 713/165 |
| 2007/0174627 | A1 | 7/2007 | Teijido et al. |
| 2007/0180084 | A1 | 8/2007 | Mohanty |
| 2007/0204336 | A1 | 8/2007 | Teijido et al. |

(Continued)

FOREIGN PATENT DOCUMENTS

EP    0 697 662 A1    2/1996

(Continued)

OTHER PUBLICATIONS

PCT Notification of Transmittal of the International Search Report and the Written Opinion of the International Searching Authority, or the Declaration mailed Feb. 12, 2010, with PCT International Search Report, appl. No. PCT/US2009/047883 filed Jun. 19, 2009 (15 pgs.), Feb. 12, 2010.

(Continued)

*Primary Examiner* — Kim Vu
*Assistant Examiner* — Suman Debnath
(74) *Attorney, Agent, or Firm* — Daly, Crowley, Mofford & Durkee, LLP

(57) ABSTRACT

A method for providing secure document management includes receiving a document from a user having an associated security access profile and generating a security label to be stored as an attribute of the document. The security label includes a clearance component selected from an authorized subset of clearance components that are determined based on the security access profile associated with the user, and also includes one or more secondary security components selected from an authorized subset of secondary security components that are determined based on the clearance component of the security label and the security access profile associated with the user. The method includes storing the document in a document repository storing a plurality of documents each having an associated security label, and determining whether a third-party user is authorized to access the document based on a comparison of a security access profile of the third-party user and the security label associated with the document.

17 Claims, 11 Drawing Sheets

U.S. PATENT DOCUMENTS

| | | | |
|---|---|---|---|
| 2008/0260153 A1* | 10/2008 | Almeida | 380/259 |
| 2008/0263631 A1* | 10/2008 | Wang et al. | 726/2 |
| 2009/0319529 A1 | 12/2009 | Bartlett et al. | 707/9 |

FOREIGN PATENT DOCUMENTS

| | | |
|---|---|---|
| WO | WO 99/64947 | 12/1999 |
| WO | WO 99/64948 | 12/1999 |
| WO | WO 02/03180 A2 | 1/2002 |
| WO | WO 02/101494 A2 | 12/2002 |
| WO | WO 03/044716 A2 | 5/2003 |
| WO | WO 2006/057639 | 6/2006 |

OTHER PUBLICATIONS

PCT Notification of Transmittal of the International Search Report and the Written Opinion of the International Searching Authority, or the Declaration mailed Mar. 25, 2010, with PCT International Search Report, appl. No. PCT/US2009/064709 filed Nov. 17, 2009 (15 pgs.).

R.S. Sandhu, P. Samarati, "Access Control: Principles and Practice", 2460 IEEE Communications Magazine, 32 (Sep. 1994), No. 9, New York (9 pgs.).

Data Sheet, "EMC Documentum Portlets, 'Powering today's business processes through a portal,'" EMC[2], retrieved from http://www.emc.com/collateral/software/data-sheet/h3125_portlets_ds.pdf, Data Sheet No. 23201104V4, 4 pages, Nov. 2004.

White Paper, "Managing Access to Content Across a Distributed Enterprise, 'Strategies for Improving Content Infrastructure in a Global Enterprise,'" EMC[2], retrieved from http://www.emc.com/collateral/software/white-papers/wp-dist-content.pdf, 12 pages, Oct. 3, 2006.

Data Sheet, "EMC Documentum Webtop, 'Browser-based access to EMC Documentum content management,'" EMC[2], retrieved from http://www.emc.com/collateral/software/data-sheet/h3967-webtop-ds.pdf, Data Sheet h3967, 2 pages, Mar. 2008.

White Paper, "EMC Documentum Architecture: Delivering the Foundations and Services for Managing Content Across the Enterprise, 'A Detailed Review,'" EMC[2], retrieved from http://www.emc.com/collateral/software/white-papers/h3411-documentum-architecture-wp.pdf, 36 pages, Jan. 2008.

Wendy S. Bartlett, et al., "Information Rights Management" Patent Application, filed with the U.S. Patent and Trademark Office, U.S. Appl. No. 12/487,353, 58 pages, Date Filed Jun. 18, 2009.

Bartlett et al., U.S. Appl. No. 12/487,353, "Information Rights Management," Office Action mailed by the Patent Office on Jun. 2, 2011.

Bartlett et al., U.S. Appl. No. 12/487,353, "Information Rights Management," Response to Office Action mailed to the Patent Office on Sep. 2, 2011.

* cited by examiner

SECURE DOCUMENT MANAGEMENT

RELATED APPLICATIONS

This application claims the benefit under 35 U.S.C. section 119(e) of the priority of U.S. Provisional Application No. 61/120,353, filed Dec. 5, 2008, entitled "Secure Document Management."

TECHNICAL FIELD

This invention relates generally to document management and more particularly to secure document management.

BACKGROUND

It is often beneficial for an entity such as an enterprise to manage electronic documents using a document management system. In general, a document management system is a system for one or more of tracking, storing, editing, and securing electronic documents. As an example, a document management system may be a complex computer-implemented system for managing electronic documents from a number of geographically distributed locations. In certain systems, the document management system may provide functionality for securing electronic documents managed using the document managing system.

SUMMARY

According to the present invention, disadvantages and problems associated with previous techniques for providing secure document management may be reduced or eliminated.

In certain embodiments, a method for providing secure document management includes receiving a document from a user having an associated security access profile and generating a security label to be stored as an attribute of the document. The security label includes a clearance component selected from an authorized subset of clearance components that are determined based on the security access profile associated with the user, and also includes one or more secondary security components selected from an authorized subset of secondary security components that are determined based on the clearance component of the security label and the security access profile associated with the user. The method includes storing the document in a document repository storing a plurality of documents each having an associated security label, and determining whether a third-party user is authorized to access the document based on a comparison of a security access profile of the third-party user and the security label associated with the document.

Particular embodiments of the present invention may provide one or more technical advantages. In many applications, it may be beneficial for an entity to have a document management system that allows personnel within the entity to share data and collaborate, but it may be appropriate for the capability to share data and collaborate to be balanced with the need to maintain a degree of control over which personnel within the entity may access or otherwise interact with possibly sensitive data. Conventional document management systems, such as that provided by the Documentum 6, SP1 content server coupled with the Webtop client interface, may provide an entity with the ability for personnel to share information and collaborate in various ways, but these conventional systems generally lack the ability to maintain stringent access control according to distinct security levels within the entity. In certain embodiments, the generation of a security label to be stored as an attribute of each document created within, imported into, or shared within the document management system of an entity may provide the entity with the ability for personnel to share documents within the entity and collaborate in various ways while maintaining stringent access control to the documents according to distinct security levels within the organization.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
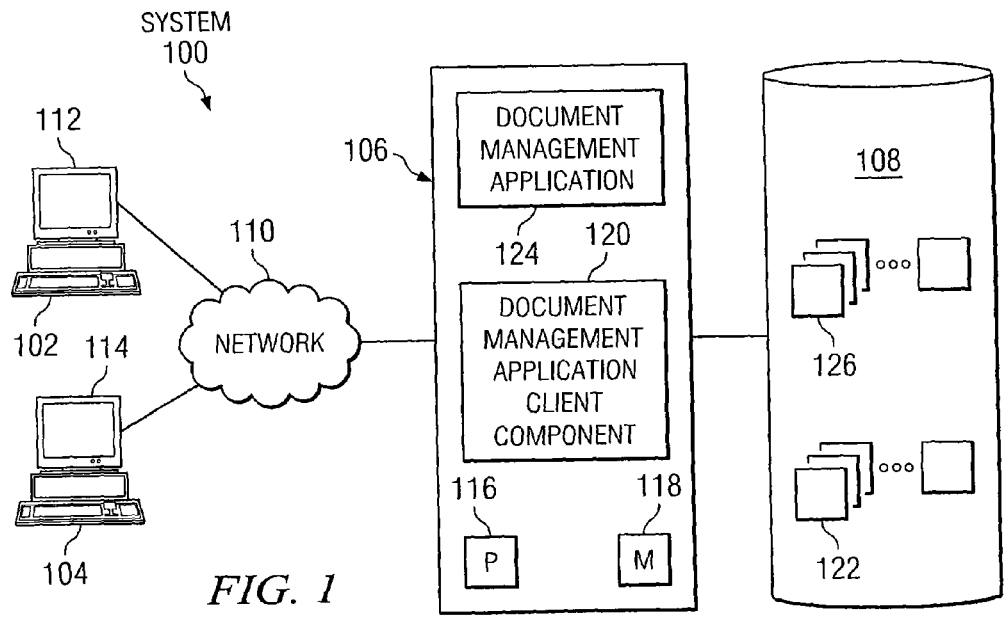
FIG. 1 illustrates an example system for providing secure document management, according to certain embodiments of the present invention.

FIG. 1 illustrates an example system 100 for providing secure document management, according to certain embodiments of the present invention. System 100 may include one or more user systems 102, one or more administrative systems 104, one or more server systems 106, one or more document repositories 108, and a network 110. Although this particular implementation of system 100 is illustrated and primarily described, the present invention contemplates any suitable implementation of system 100 according to particular needs.

In general, system 100 is operable control access to a document by generating a security label that is stored as an attribute of the document. The security label can be compared to a security access profile associated with a user seeking to access the document in order to determine if the user may access the document. A document may include a spreadsheet, a text document, an e-mail, a web page, program source code, an image file, or any other suitable type of document. Certain embodiments of the present invention may allow personnel within an organization to share documents to collaborate in various ways while maintaining stringent access control to the documents according to distinct security levels within the organization.

System 100 may include one or more user systems 102 and one or more administrative systems 104. "User system 102" and "user of user system 102" may be used interchangeably. A user of user system 102 may include, for example, a human user or a computer program or other suitable software module for automatically interacting with user system 102. Likewise, "administrative system 104" and "user of administrative system 104" may be used interchangeably. A user of administrative system 104 may include, for example, a human user or a computer program or other suitable software module for automatically interacting with administrative system 104.

Each user system 102 and administrative system 104 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of administrative system 104. Each computer system may include a personal computer, workstation, network computer, kiosk, wireless data port, personal data assistant (PDA), one or more processors within these or other devices, or any other suitable processing device. As an example, system 100 may include multiple distributed user systems 102 and/or administrative systems 104. User systems 102 and administrative systems 104 may be physically distributed, being in different locations geographically remote from each other and from the other components of system 100, or logically distributed, being at approximately the same location as other user systems 102 and administrative systems 104 and the other components of system 100. For simplicity, the one or more user systems 102 and administrative systems 104 of system 100 are referred to throughout this description primarily in the singular.

In certain embodiments, user system 102 and administrative system 104 may each include a graphical user interface (GUI) 112 and 114, respectively, that allows user system 102 and administrative system 114 to interact with other components of system 100. GUIs 112 and 114 may be delivered using an online portal or hypertext mark-up language (HTML) pages for display and data capture. As a particular example, GUI 112 may allow user system 102 to interact with a web server having a client component (e.g., client component 120 of server system 106, described in more detail below), the web server providing an interface between the client and a content server having a document management application (e.g., document management application 125 of server system 106, described in more detail below) coupled to a database (e.g., document repository 108). As another particular example, GUI 114 may allow administrative system 104 to interact with a web server having a client component (e.g., a client component 120 of server system 106, described in more detail below), the web server providing an interface between the client and a content server having a document management application (e.g., document management application 125 of server system 106, described in more detail below) coupled to a database (e.g., document repository 108).

Although user system 102 and administrative system 104 are illustrated and primarily described as being separate, it is understood that the computer systems and the functionality associated with user system 102 and administrative system 104 may be combined or separated in any suitable manner.

System 100 may include one or more server systems 106, referred to primarily in the singular throughout the remainder of this description. Server system 106 may include one or more electronic computing devices operable to receive, transmit, process, and store data associated with system 100. For example, server system 106 may include one or more general-purpose PCs, Macintoshes, workstations, Unix-based computers, server computers, one or more server pools, or any other suitable devices. In certain embodiments, server system 106 includes a web server. In short, server system 106 may include any suitable combination of software, firmware, and hardware. In certain embodiments, server system 106 comprises an email server, which may or may not be a part of a larger server system. Although a single server system 106 is illustrated, the present invention contemplates system 100 including any suitable number of server systems 106. Moreover, although referred to as a "server system," the present invention contemplates server system 106 comprising any suitable type of processing device or devices.

Server system 106 may include a processing module 116 and a memory module 118. Processing module 116 may include one or more microprocessors, controllers, or any other suitable computing devices or resources. Processing module 116 may work, either alone or with other components of system 100, to provide a portion or all of the functionality of system 100 described herein. Memory module 118 may take the form of volatile or non-volatile memory including, without limitation, magnetic media, optical media, random access memory (RAM), read-only memory (ROM), removable media, or any other suitable memory component.

User system 102 and administrative system 104 may be communicatively coupled to one another as well as to server system 106 via network 110. Network 110 facilitates wireless or wireline communication. Network 110 may communicate, for example, IP packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations.

System 100 may include one or more document repositories 108. Document repository 108 may include a database or other suitable memory module and may take the form of volatile or non-volatile memory, including, without limitation, magnetic media, optical media, RAM, ROM, removable media, or any other suitable local or remote memory component. In certain embodiments, document repository 108 includes one or more SQL servers. Document repository 108 may store a plurality of documents 122, each document 122 having an associated security label stored as an attribute of the document as described in greater detail below. Document repository 108 may store plurality security access profiles 126, each security access profile associated with a user of system 100 (e.g., a user of user system 102).

In certain embodiments, server system 106 may include a document management application 124. Document management application 124 may be operable to manage the creation of and access to documents 122 stored in document repository 108. In certain embodiments, server system 106 may also include a document management application client component ("client component") 120 that provides an interface for user system 102 and administrative system 104 to interact with document management application 124. Although certain functionality described below is described as being associated with either client component 120 or document management application 124, it is understood that the functionality may be provided by any suitable combination of client component 120 and document management application 124.

Figure 2:
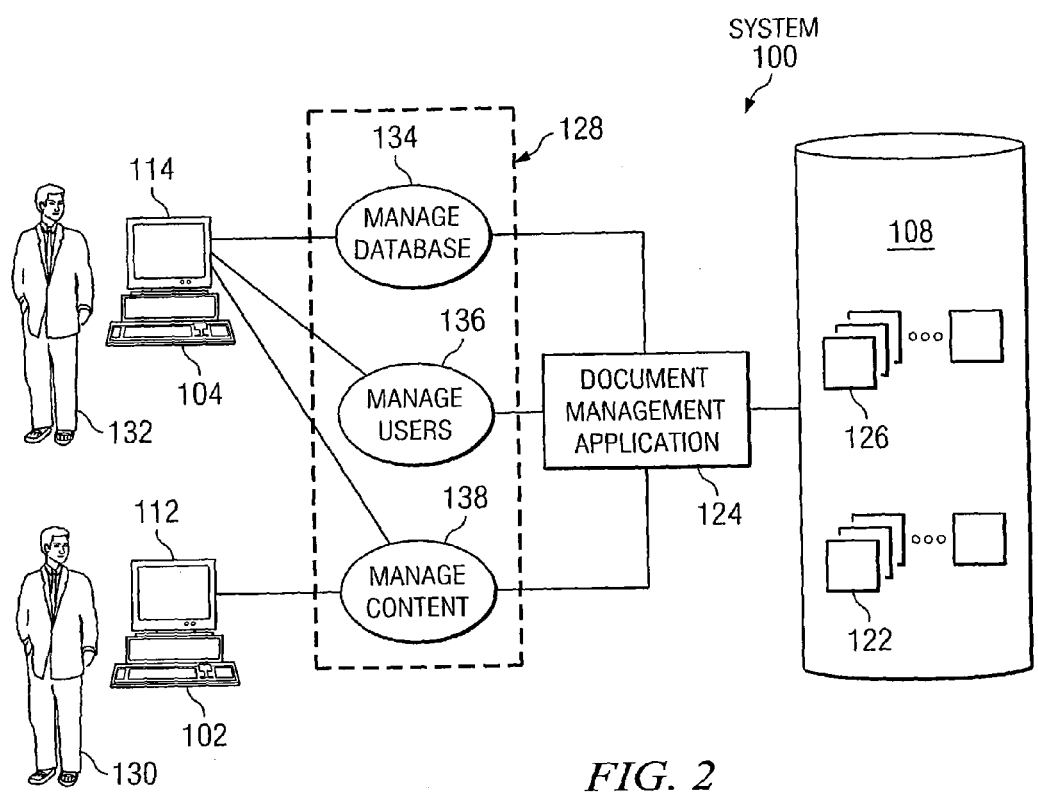
FIG. 2 illustrates example functions performed by users and administrators in an example system for providing secure document management, according to certain embodiments of the present invention.

Document management application 124 may be operable to provide an administrator (e.g., a user of administrative system 104) with the ability to manage users of system 100 and document repository 108 (as illustrated in FIG. 2). Managing the users of system 100 and document repository 108 may include creating groups, creating users, deleting groups, deleting users, assigning an existing user to a new group, modifying a user, and/or any other suitable functions according to particular needs.

For example, document management application 124 may allow an administrator to create one or more groups. As a particular example, in a national defense context an administrator may create a number of clearance groups (e.g., top-secret clearance group, secret clearance group, and confidential clearance group). The clearance groups may be arranged in a vertical hierarchy such that, for example, a member of the top-secret clearance group would also, by default, be a member of all lesser groups (i.e., secret and confidential clearance groups in this example). As another particular example, an administrator may create one or more secondary security groups (e.g., each clearance group described in the example above may have a Dallas office group, a Washington D.C. office group, and a New York office group). Furthermore, each secondary security group may be associated with a particular clearance group such that the secondary security groups may be arranged horizontally within each clearance group. This horizontal arrangement of secondary security groups within each clearance group may result in a lack of a hierarchy, meaning that membership in one secondary security group would not necessarily indicate, by default, membership in another secondary security group. An example method for creating new groups using document management application 124 is described in greater detail below with respect to FIG. 6.

As another example, document management application 124 may allow an administrator to create one or more users. Furthermore, the administrator may be able to assign the created user to one or more groups. The one or more groups assigned to a particular user may define, at least in part, a security access profile 126 associated with the user, the security access profiles associated with the one or more users of system 100 being stored in document repository 108. An example method for creating new users using document management application 24 is described in greater detail below with respect to FIG. 7.

Document management application 124 may allow a user of user system 102 to manage the content of documents 122 stored in document repository 108 (as illustrated in FIG. 2). Managing the content of a document in document repository 108 may include storing a document in document repository 108, accessing a document stored in document repository 108, emailing a document stored in document repository 108, or any other suitable function according to particular needs.

For example, document management application 124 may allow a user of user system 102 to manage the content of documents 122 stored in document repository 108 by allowing the user to store a document in document repository 108. Storing a document, as described herein, may include creating a new document, importing an existing document (described in greater detail in connection with FIG. 9, below), or checking in an edited version of a document 122 already stored in document repository 108 (described in greater detail below with respect to FIG. 10).

Document management application 124 may be operable to create a security label associated with a document that the user seeks to store in document repository 108. Document management application 124 may create the security label on its own or based on input received from the user. In certain embodiments, document management application 124 may facilitate the creation of a security label for each document 122 stored in document repository 108. The security label for a document 122 may be stored as an attribute of the document. As a document 122 is accessed and/or edited, it may be appropriate for the security label associated with the document 122 to be updated. Thus, document management application 124 may request that a user update the security label (or document management application 124 may update the security label on its own) in response to the user accessing or modifying the document 122.

The security label associated with a document 122 may include one or more components. One or more of the components of the security label may correspond to the one or more defined groups of users, the groups of users having been defined by an administrator, as described above. For example, the security label may include a clearance component corresponding to a clearance group (e.g., top-secret, secret, or confidential) and a secondary security component corresponding to a secondary security group (e.g., Dallas office, Washington office, and New York office).

Furthermore, the possible clearance and/or secondary security components of the security label available to a particular user seeking to store a document may be limited based upon the group memberships of the user such that a user would only be able to designate security label components corresponding to a group to which the user is a member. For example, a user belonging to the secret clearance group and the Dallas office secondary security group who seeks to store a document in document repository 108 may specify that the clearance component of the security label be either secret or confidential (as the users belongs to both groups in this example) and that the secondary security component of the security label be Dallas office.

Additionally, one or more other components of the security label may not correspond to the one or more defined groups of users. For example, the security label may have a handling component (e.g., proprietary) that indicates some information about the data contained in the document.

Although the user may specify both a clearance and a secondary security component, the present invention contemplates that user may decline to specify a clearance component (e.g., by designating that the clearance component be "unclassified"), a secondary security component (e.g., by designating that the secondary security component be "unspecified"), or both. Furthermore, if a user designates the clearance component of the security label to be "unclassified," further access to the document may not be restricted according to group membership (i.e., no secondary security component selection is necessary, as secondary security components are sub-components of the clearance component selection). Examples of these scenarios are described below in greater detail.

In certain embodiments, if the clearance component of the security label is not specified (e.g., by selecting unclassified as opposed to top-secret, secret, or confidential), the user may select a handling component of the security label. The handling component may not restrict further access to the document but may indicate information associated with the document (e.g., that the information in the document is proprietary). The storing of documents and the creation of associated security labels is described in more detail below with reference to FIGS. 5 and 9-10.

In certain embodiments, client component 120 of server system 106 is operable to facilitate interaction between user system 102 and document management application 124 in the creation of the security label associated with the storing of a document by determining the intersection between the available security label components and those components the user is authorized to select based on user's security access profile 126 stored in document repository 108. Once the appropriate intersection is determined, client component 120 may populate a menu with the available document security label component options, the menu being displayed to the user of system 102 via GUI 112. In the above-described example, the clearance component menu would include secret, confidential, and unclassified selections for the clearance component of the security label. The user of user system 102 may select the desired clearance component of the security label (e.g., secret) using the clearance component menu.

In response to receiving a clearance component for the security label from the user seeking to store the document, client component 120 may populate a menu including the possible secondary security components associated with the selected clearance component for the document. In the above-described example, the user of user system 102 is a member of the Dallas office secondary security group only. As described above, however, the user may elect not to specify a secondary security component such that further access will not be restricted according to secondary security group membership, so the secondary security component menu would include Dallas office and unspecified selections for the secondary security component of the security label. The user of system 102 may then select the desired one or more secondary security components of the security label (e.g., Dallas office).

If, however, the user of system 102 specifies that the clearance component be unclassified, as described above, client component 120 may not populate a secondary security component menu, but instead, may populate a handling component menu with the possible handling components. Because a handling component typically is selected when document access will not be restricted according to group membership, the handling component menu may include all possible handling component selections (not limited by the group memberships of the user seeking to store the document). As a particular example, if the user seeking to store the document selects that the clearance component be unclassified, the user may select a handling component of the security label (e.g., proprietary, indicating that although access to the document will not be restricted, the document contains proprietary information).

In response to user selection of the components of the security label for the document to be stored in document repository 108, document management application 124 may store the security label as an attribute of the document. In certain embodiments, the security label may be displayed as part of the document. The security label may be used by document management application 124 to determine which users may access the document.

Once a particular document and its associated security label have been stored in document repository 108 (as a particular document 122), document management application 124 may be operable to determine if a user of system 102 is authorized to access the particular document 122 in order to edit the particular document 122.

In certain embodiments, document management application 124 may determine if the user of system 102 is authorized to access the document 122 stored in document repository 108 by comparing the security label associated with the document 122 and the security access profile 126 of the user in response to receiving a request from a user of system 102 to access a document 122.

As a particular example, a requested document 122 stored in document repository 108 may have an associated security label comprising a clearance component (secret) and a secondary security component (Dallas office). In response to receiving a request to access the document 122 from a requesting user, document management application 124 may access the security access profile 126 associated with the requesting user and compare at least a portion of the security access profile 126 with the security label associated with the requested document 122. If the requesting user has an associated security access profile 126 indicating that the requesting user belongs to the top-secret clearance group and the Dallas office secondary security group, document management application 124 may determine that the requesting user is authorized to access the document 122, as the user would belong to both groups specified by the components of the security label for the document 122.

As another particular example, a requested document 122 stored in document repository 108 may have an associated security label that includes a clearance component (secret) and a secondary security component (Dallas office). If the requesting user has an associated security access profile 126 indicating that the requesting user belongs to the secret clearance group and the Washington office secondary security group, document management application 124 would determine that the requesting user is not authorized to access the document 122, as the secondary security group of the user does not match the secondary security component of the security label. If, however, upon creating the document 122, the creating user had not selected the Dallas office secondary security component but instead chose not to specify a secondary security component, the requesting user having an associated access profile indicating that the requesting user belongs to the secret clearance group and the Washington office secondary security group would be allowed access because the user would belong to the group specified by the component of the security label.

As another particular example, a requested document 122 stored in document repository 108 may have an associated security label comprising a clearance component (unclassified) and a handling component (proprietary). The requesting user would be allowed to access the document 122 regardless of the security access profile 126 of the user, as the security label indicates that the clearance component is unclassified. This unclassified category indicates that access to the document 122 is not restricted according to group membership. Furthermore, the handling component of the security label is not restrictive in that it does not correspond to group membership but merely provides information relevant to the unrestricted document 122.

In certain embodiments, document management application 124 may generate a virtual document, to be displayed to a user of system 102 on GUI 112. The virtual document may have one or more child virtual documents corresponding to those documents 122 stored in document repository 108 that the user is authorized to access based on a comparison of the security label associated with each of the documents 122 and the security access profile 126 of the user.

For example, in response to receiving a query request for documents 122 from a user of system 102, document management application 124 may determine those documents 122 that meet query parameters of the query request. Document management application 124 may compare the security label associated with each of those documents 122 to the security access profile 126 of the user to determine which of the documents the user is authorized to access. Document management application 124 may generate a virtual document to be displayed to the user of system 102 on GUI 112, the virtual document including a number of child virtual documents corresponding to those documents 122 meeting the query parameters that the user is authorized to access. As a particular example, the virtual document comprising the one or more child documents may appear as a tree-like directory structure. The user of system 102 may select one or more of the virtual child documents in order to access the corresponding document 122 stored in document repository 108.

Having gained access to a document 122 stored in document repository 108, a user of system 102 may edit the document as needed. Once the editing of the document 122 is complete, the user may seek to store the edited version of the document 122 in document repository 108 (e.g., to check-in the document with its revisions). The edited version of the document 122 may replace the corresponding accessed document 122, be stored in addition to the corresponding accessed document 122, or be stored in any other suitable manner. Document management application 124 may allow the user to update the security label for the edited version of the document 122 to account for edits the user may have made to the document.

As a particular example, a user of system 102 having an associated security access profile 126 indicating that the user belongs to the top-secret clearance group and the Dallas office secondary security group may access a document 122 stored in document repository 108. It will be assumed in this example that the document 122 has an associated security label including a secret clearance component and a Dallas office secondary security component. The user of system 102 may then edit the accessed document 122 by adding content to the document 122. The user of system 102 may then seek to store the edited version of the document 122 in document repository 108. As a result of the added content, the user of system 102 may update the security label associated with the edited version of the document 122, the updating of the security label taking into account the group memberships of the editing user, as described above regarding the creation of the security label. For example, the user of system 102 may update the security label associated with the edited version of the document 122 such that the updated security label comprises a top-secret clearance component and a Dallas office secondary component. Similarly, the user of system 122 may edit the document 122 by deleting content. As a result of the deleted content, the user of system 102 may update the security label associated with the edited version of the document 122 such that the updated security label comprises a confidential clearance component and a Dallas office secondary component.

Document management application 124 may allow a user of system 102 to access a document 122 stored in document repository 108 in order to communicate the document 122 to another user via email. Document management application 124 may compare the security label of the document 122 to be accessed and communicated to the security access profile 126 of the user requesting that the document be communicated. Assuming that the requesting user is authorized to access the document, document management application 124 may also compare the security label of the accessed document to the security access profile 126 of the intended recipient to ensure that the recipient is also authorized to access the document. The ability to have a document sent to another user via email is described in more detail below with respect to FIG. 11.

Although server system 106 is illustrated and primarily described as a single server performing the above described functionality associate with client component 120 and document management application 124, the present invention contemplates server system 106 including any suitable number of servers performing any suitable combination of the above-described functionality. As a particular example, server system 106 may include a content server running the document management application 124 and a separate web server running the document management application client component. Furthermore, although particular functionality of system 100 illustrated in FIG. 1 has been described above as being performed by either or both of client component 120 or document management application 124, the present invention contemplates that the functionality may be provided by any suitable combination of components of system 100.

In certain embodiments, the above-described functionality of client component 120 and document management application 124 may be achieved by supplementing and/or modifying the functionality associated with existing document management applications and their associated client applications. A particular example of such an existing document management application and its associated client application are is Documentum 6, SP1 and the client application Webtop. In certain embodiments, document management application Documentum 6, SP 1 and client application Webtop may be modified and/or supplemented with additional functionality in order to achieve a portion or all of the functionality described above.

More particularly, Documentum's Content Server and its associated Webtop interface provide an enterprise content management system with the ability to share files and collaborate in various ways. Among other deficiencies, the Documentum Content Serer and the Webtop interface provide no off-the-shelf ability to set and display security labels for documents created within, imported to, or shared within the Documentum database. According to certain embodiments of the present invention, the Documentum Content Server and/or the Webtop interface may be modified/supplemented with interface customizations that allow users to create a security label for documents being stored in the Documentum database, the security label having a number of components such as the above-described clearance component based on predefined clearance groups (e.g., top-secret, secret, confidential).

The system provided by the Documentum server coupled with the Webtop interface may be modified to allow an administrator to define the clearance groups (which may also define the available clearance components of the security label), as well as to add and remove users from those groups.

Additionally or alternatively, the system provided by the Documentum server coupled with the Webtop interface may be modified to allow administrators to verify adherence to a particular security policy associated with a particular enterprise.

In certain embodiments, the workflow interface of the system provided by the Documentum server coupled with the Webtop interface (e.g., allowing a user to check out and edit a document stored in the Documentum database) may be modified such that access to the documents stored in the Documentum database is restricted according to the security label components associated with the document. The import, check-in, and new document storing features of the system provided by the Documentum server coupled with the Webtop interface may be modified to provide a content scanning capability. The content scanning capability may include scanning the content of the document to be stored to ensure that the user-defined security label is consistent with the content of the document. Potentially, a document that has an inappropriate security label may be quarantined.

In certain embodiments, various software applications may be used to create an application for implementing the above-described modifications to the Document environment. For example, Documentum DA may be used to recognize and contrast initial versus modified system functionality. As another example, Eclipse may be used as a basis for the development environment, providing the development tools for creating, compiling, running, and debugging the customized code. Furthermore, Documentum Composer (a plug-in for Eclipse) may provide a simplified way to carry out many complex Documentum development tasks. As yet another example, Mozilla Firefox/Firebug (browser) may be used to retrieve the customized presentation files (JSP/XML/HTML), Firebug being a plug-in for Firefox that enables tracing through the Document Object Model (DOM). Additional examples of software applications that may be used include Beyond Compare (a file system tracing tool that may be used to identify the deltas is the web application directory tree structure as well as the deltas between files), Enterprise Architect (a design tool for creating an application for implementing the above-described modifications to the system provided by the Documentum server coupled with the Webtop interface), and VMWare Workstation (software providing a virtualization environment). Although these particular components are primarily described, the present invention contemplates any suitable components being used to create an application for implementing the above-described modifications to the Documentum environment.

The modification to and/or supplementation of Documentum 6, SP 1 content server and/or the Webtop client interface as contemplated by the present invention is described in more detail in connection with FIGS. 4A and 4B, below.

Although a particular implementation of system 100 is illustrated and primarily described, the present invention contemplates any suitable implementation of system 100 according to particular needs. Although a particular number of components of system 100 have been illustrated and primarily described above, the present invention contemplates system 100 including any suitable number of such components. Furthermore, the various components of system 100 described above may be local or remote from one another. Additionally, the components of system 10 may be implemented in any suitable combination of hardware, firmware, and software.

In operation of an example embodiment, system 100 includes a plurality of users (each having an associated user system 102), each user belonging to none, one, or more user groups. The group membership of a user may define, at least in part, a security access profile 126 associated with the user. A user of system 102 may communicate a request to store a document to document management application 124 (i.e., with client component 120 providing an interface between user system 102 and document management application 124).

In response to the request, document management application 124 may prompt the user to create a security label to be stored as an attribute of the document, the security label having a clearance component and either a secondary security component or an unclassified component. In certain embodiments, the creation of this security label is required for the user able to store the document. Client component 120 may facilitate the creation of the security label by populating menus from which a user may select the components of the security labels. In certain embodiments, the user may be provided initially with a clearance component menu indicating those clearance components the user may select based on the group membership of the user, as well as the option to specify that the clearance component be unclassified.

In response to receiving a clearance component selection other than unclassified, client component 120 may populate an additional secondary security component menu indicating those secondary security components within the selected clearance component that the user may select based on the group membership of the user, as well as the option to designate that the secondary security component remain unspecified. In response to receiving a clearance component of unclassified, client component 120 may populate an additional handling component menu indicating the available handling components. Once component selections have been made, document management application 124 may store the document with the associated security label having the selected components in document repository 108 (e.g., as a document 122). In response to a later request to access the document 122 stored in document repository 108, document management application 124 may determine if the requesting user is authorized to access the document 122 based on a comparison of security label associated with the requested document 122 and the security access profile 126 of the requesting user.

Particular embodiments of the present invention may provide one or more technical advantages. In many applications, it may be beneficial for an entity to have a document management system that allows personnel within the entity to share data and collaborate, but it may be appropriate for the capability to share data and collaborate to be balanced with the need to maintain a degree of control over which personnel within the entity may access or otherwise interact with possibly sensitive data. Conventional document management systems, such as that provided by the Documentum 6, SP 1 content server coupled with the Webtop client interface, may provide an entity with the ability for personnel to share information and collaborate in various ways, but these conventional systems generally lack the ability to maintain stringent access control according to distinct security levels within the entity. In certain embodiments, the generation of a security label to be stored as an attribute of each document 122 created within, imported into, or shared within the document management system of an entity may provide the entity with the ability for personnel to share documents 122 within the entity and collaborate in various ways while maintaining stringent access control to the documents 122 according to distinct security levels within the organization.

FIG. 2 illustrates example functions performed by users and administrators in an example system 100 for providing secure document management, according to certain embodiments of the present invention. System 100 includes a user 130 associated with a user system 102 and an administrator 132 associated with an administrative system 104. In the illustrated embodiment, document management application 124 is operable to provide functionality associated with managing document repository 108 (as indicated at reference numeral 134), managing users of system 100 (as indicated at reference numeral 136), and managing the content of the documents 122 in document repository 108 (as indicated at reference numeral 138). Interface 128 represents the interface between users 130 and administrators 132 and document management application 124. Interface 128 may be provided by client component 120 (described above with respect to FIG. 1).

In certain embodiments, a user 130 of user system 104 manages the content of the documents 122 in document repository 108 (as indicated at reference numeral 138). As described above, managing the content of the document in document repository 108 may include storing a document in document repository 108 (such as by creating a new document, importing an existing document, or checking in an edited version of the document), accessing a document 122 stored in document repository 108 in order to edit the document 122, sending a document 122 stored in document repository 108 to another user of system 100 via email, or any other suitable function. For example, managing the content of a document may also include the ability for the user 130 to create virtual containers and documents, displaying both the security access profile 126 of the user 130 and the security label of the document 122 through multiple views, allowing the user 130 to examine versions of the document 122 for tracking security label components associated with the document 122 (maintaining the policies of no read up, no write down).

In certain embodiments, an administrator 132 of administrative system 104 may manage document repository 108 (as indicated at reference numeral 134), manage users 130 of system 100 (as indicated at reference numeral 136), and manage the content of documents 122 in document repository 108 (as indicated at reference numeral 138). Managing document repository 108 may include managing the properties of document repository 108. Managing users 130 of system 100 may include creating new users, creating new groups, placing a user in a group, deleting users, or any other suitable function according to particular needs. Managing the content of documents 122 may include the functionality described as being performed by user 130.

Figure 3:
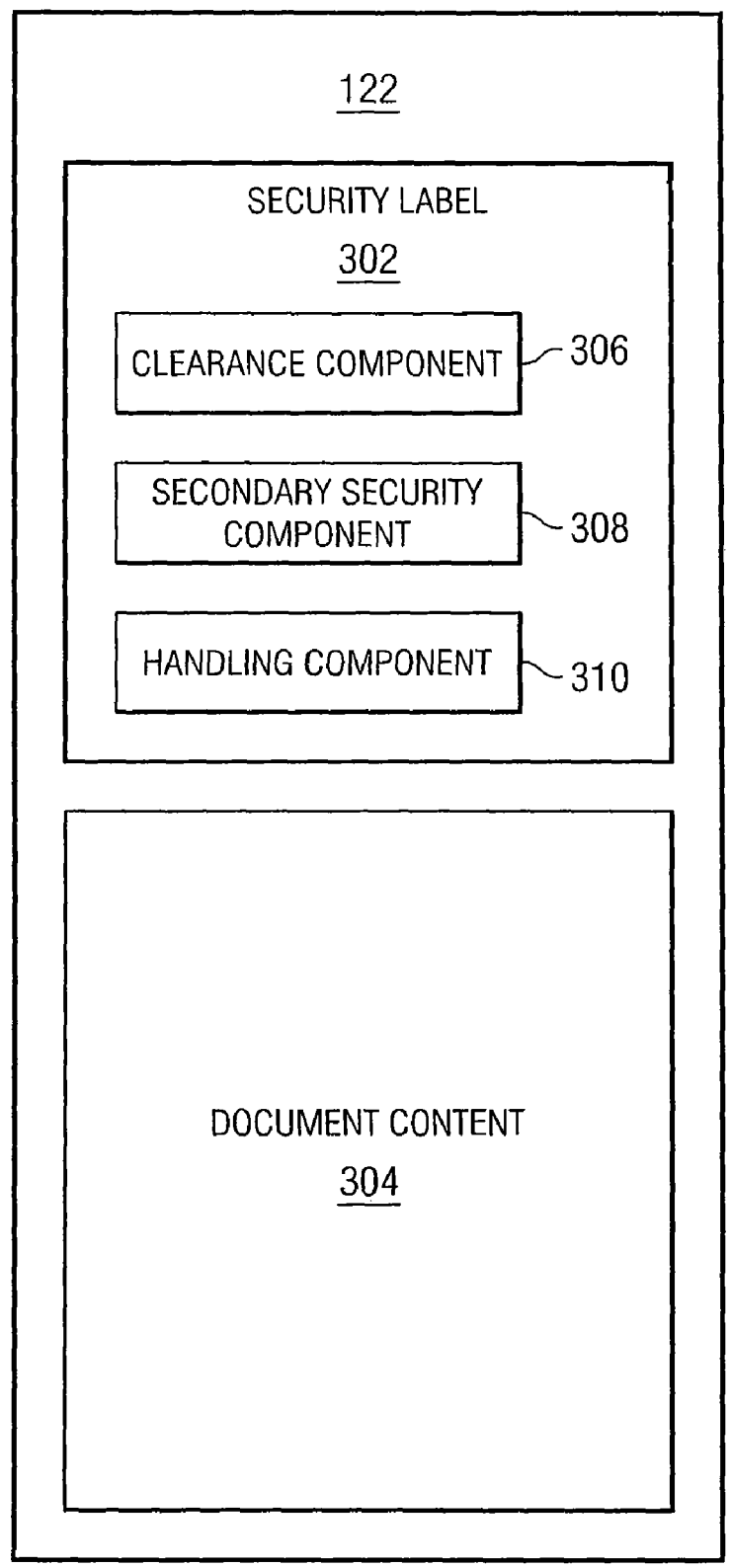
FIG. 3 illustrates an example document stored in a document repository in an example system for providing secure document management, according to certain embodiments of the present invention.

FIG. 3 illustrates an example document 122 stored in a document repository 108 in an example system 100 for providing secure document management, according to certain embodiments of the present invention. Document 122 may have an associated security label 302 and document content 304. In certain embodiments, security label 302 is stored as an attribute of document 122. The present invention contemplates document 122 including any other suitable attributes such as date of document creation, location of document creation, and document number. Document content 304 represents the remainder of the information (other than the security label and other attributes described above) associated with document 122 (e.g., text, figures, or other suitable content).

As described above, in certain embodiments, security label 302 associated with document 122 may include a clearance component 306 (corresponding to one or more clearance groups) and a secondary security component 308 (corresponding to one or more secondary security groups). For example, clearance component 306 of security label 302 may be confidential (corresponding to a confidential clearance group), secret (corresponding to a secret clearance group), or top-secret (corresponding to a top-secret clearance group). Furthermore, secondary security component 308 of security label 302 may be Dallas office (corresponding to a Dallas office secondary security group), Washington office (corresponding to a Washington office secondary security group), or New York office (corresponding to a New York office secondary security group). Additionally, clearance component 306 and secondary security component 308 of security label 302 may restrict access to document 122 such that only users belonging to groups corresponding to the designated clearance component 306 and secondary component 308 may access document 122.

In certain embodiments, clearance component 306 of security label 302 may not be specified (e.g., may be designated "unclassified"). Similarly, the secondary security component 308 associated with document 122 may not be specified (e.g., may be designated "unspecified"). Additionally, if the clearance component 306 is designated as "unclassified," security label 302 of document 122 may also include a handling component 310 (e.g., "proprietary"). Handling component 310 of security label 302 may not restrict further access to the document but may indicate information associated with the document (e.g., that the information in the document is proprietary).

Although security label 302 associated with document 122 is illustrated and primarily described as having a number of specified components, the present invention contemplates security label 302 including any suitable number of components according to particular needs.

Figure 4A:
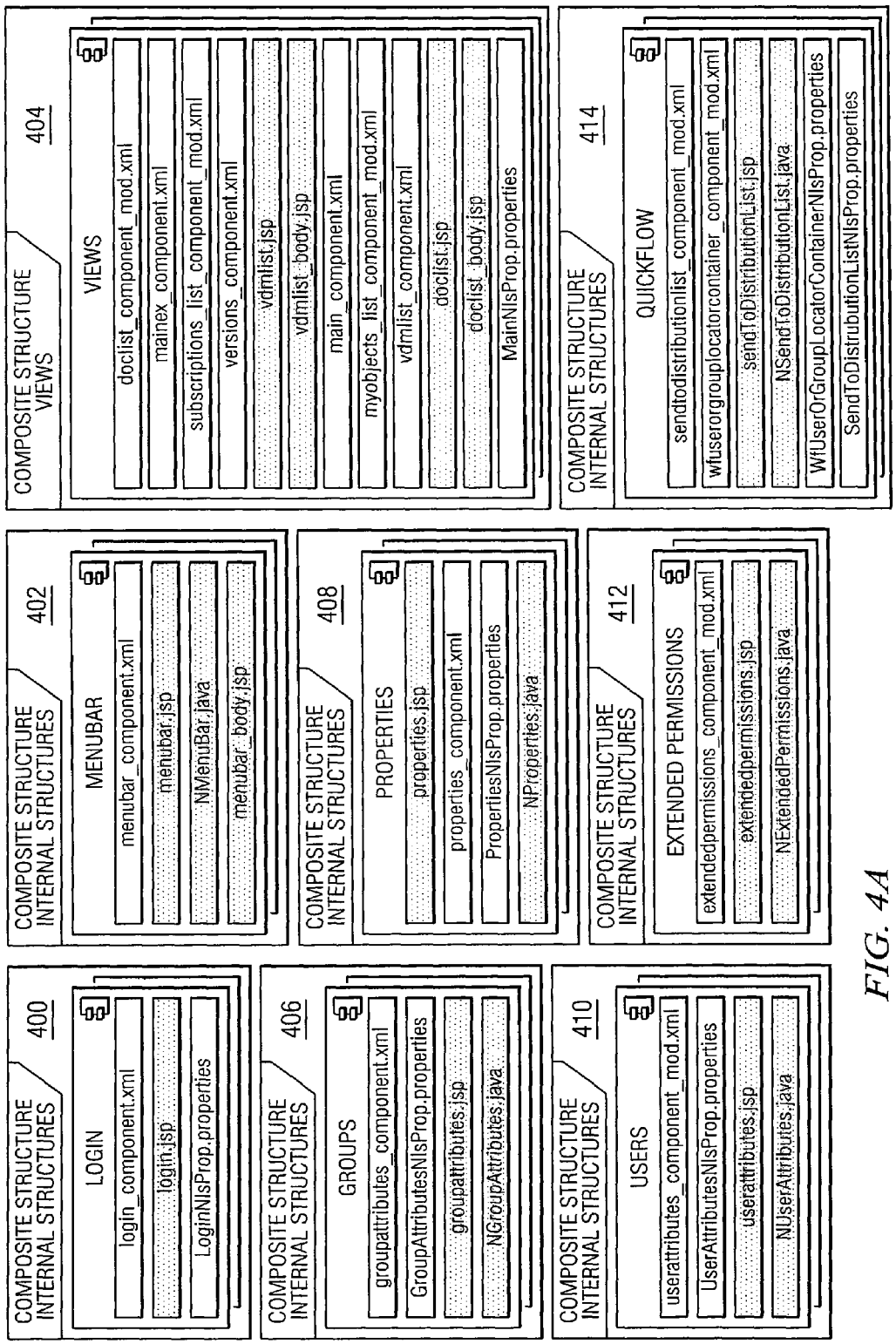
FIGS. 4A and 4B illustrate example additions to and modifications of the web components of the Webtop client interface (providing a user with an interface to the Documentum 6, SP 1 content server) to achieve some or all of the above-described functionality of the system, according to certain embodiments of the present invention.
Figure 4B:
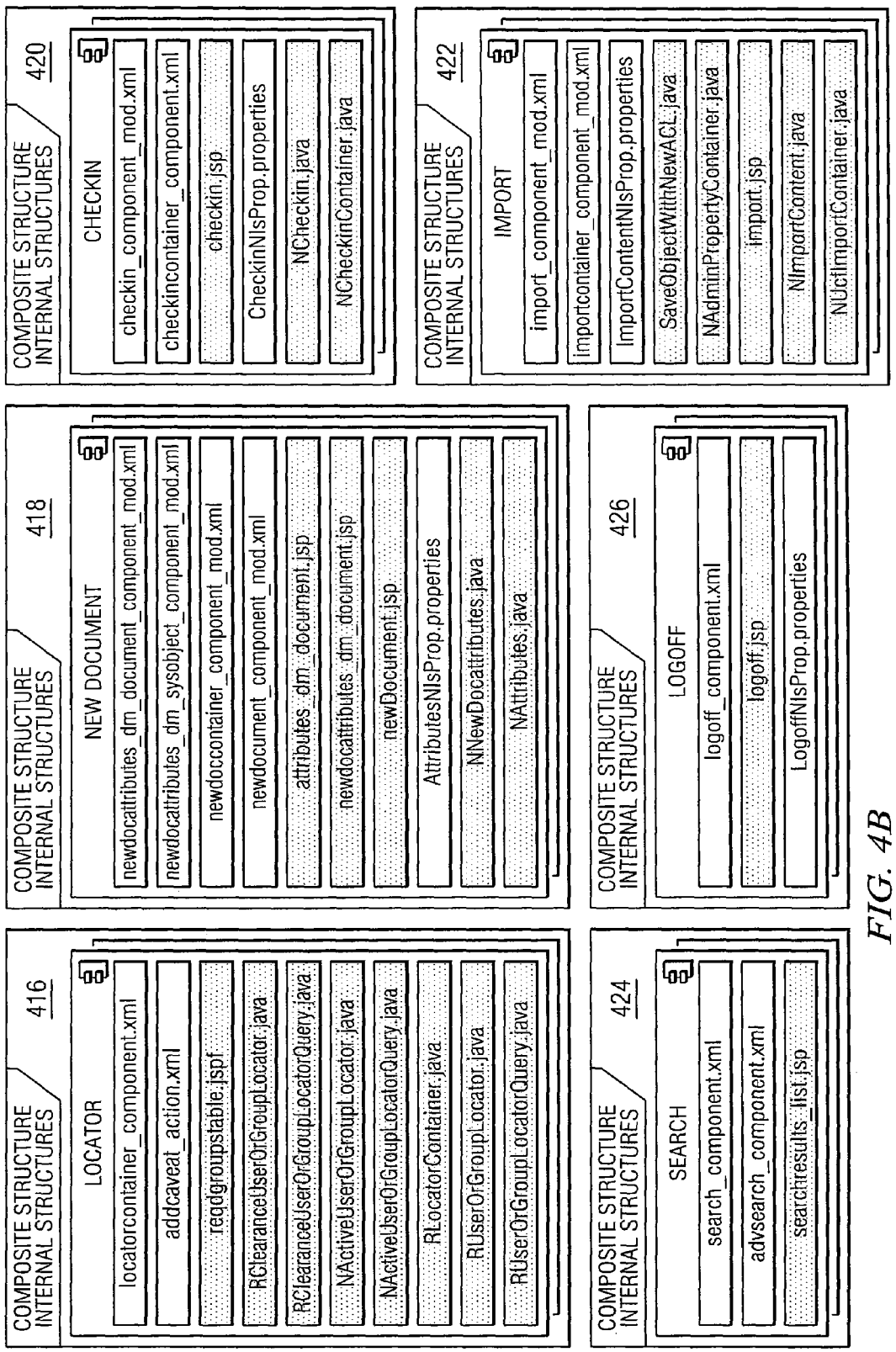

FIGS. 4A and 4B illustrate example additions to and modifications of the web components of the Webtop client interface (providing a user with an interface to the Documentum 6, SP1 content server) to achieve some or all of the above-described functionality of the secure document management system, according to certain embodiments of the present invention. Typically, when developing a web application, an Extensible Markup Language (XML) file is written to control the component used in the webpage, JavaServer Pages (JSP)/JavaServer Pages Fragment (JSPF) files to manage the display of the component, property files to maintain static strings to be used in either the display or behavior of the component, and java based behavior classes to define the customized business logic required for the component to perform the intended operations. The various blocks illustrated in FIGS. 4A and 4B illustrate the mappings between these files for the modifications of the Webtop client interface contemplated by certain embodiments of the present invention.

Block 400 illustrates example modifications to the Webtop Login web component. The Login component may be modified to remove providing a user with the capability to access Documentum content server directly as oppose to accessing the Documentum content server via the Webtop interface. Because the Webtop client interface may be modified with additional document security features, namely restricting access to documents based on the security labels associated with the documents, removing the links directly to the Documentum content server may reduce or eliminate the ability to circumvent the security measures added to the Webtop client interface.

Block 402 illustrates example modifications to the Webtop MenuBar web component. The MenuBar web component may be modified to change the display of the user menu consistent with the system functionality described above. For example, the MenuBar web component may be modified to allow a user's security access profile information (group memberships) to be displayed.

Block 404 illustrates example modifications to the Webtop Views web component. The Views web component governs the various ways a user may view a document 122 stored in the Documentum database (e.g., document repository 108). The Views web component may be modified such that, in each of the various ways a document 122 in the Documentum database may be viewed, the security label associated with the document 122 is displayed.

Block 406 illustrates example modifications to the Webtop Groups web component. The Groups web component may be modified to allow the creation of the additional groups (e.g., clearance groups and secondary security groups).

Block 408 illustrates example modifications to the Webtop Properties web component. The WebTop Properties web component governs the properties of the various objects in the Documentum database (e.g., documents, user access profiles, group membership information, etc.). The WebTop Properties web component may be modified to reflect the addition of one or more of groups, security labels for documents, and group memberships for user security access profiles.

Block 410 illustrates example modifications to the Webtop Users web component. The Webtop Users web component may be modified to reflect additional properties associated with a user, such as group membership of the user.

Block 412 illustrates example modifications to the Webtop Extended permissions web component. The Extended Permissions web component may be modified to reflect the addition of the new groups, as described above.

Block 414 illustrates example modifications to the Webtop Quickflow web component. The Webtop Quickflow component governs the ability to have a document 122 in the document repository 108 emailed to another user of the system, as described above with respect to FIG. 1. The Quickflow web component may be modified to allow a document to be emailed only to those users who are authorized to view the document based on a comparison of the security label of the document and the security access profiles of the intended recipients of the email.

Block 416 illustrates example modifications to the Webtop Locator web component. The Webtop Locator governs the determination of groups (and corresponding components) available in the system during the document labeling process. The Locator web component may be modified to allow for the filtering of those groups (components) not available based on the security access profile of the particular users seeking to store a document.

Block 418 illustrates example modifications to the Webtop New Document web component, block 420 illustrates example modifications to the Webtop Checkin web component, and block 422 illustrates example modifications to the Webtop Import web component. The New Document web component, the Checkin web component, and the import web component may be modified to reflect the addition of the ability to add a security label to the new document Block 424 illustrates example modifications to the Webtop Search web component. The Search web component may be modified to allow a user to search for a document 122 based on information contained in the security label stored as an attribute of the document 122.

Block 426 illustrates example modifications to the Webtop Logoff web component. The Logoff web component may be modified such that the user will be directed to the modified Logon display (described above with respect to block 300 in connection with the Logon web component) rather than to the unmodified logon display.

Figure 5:
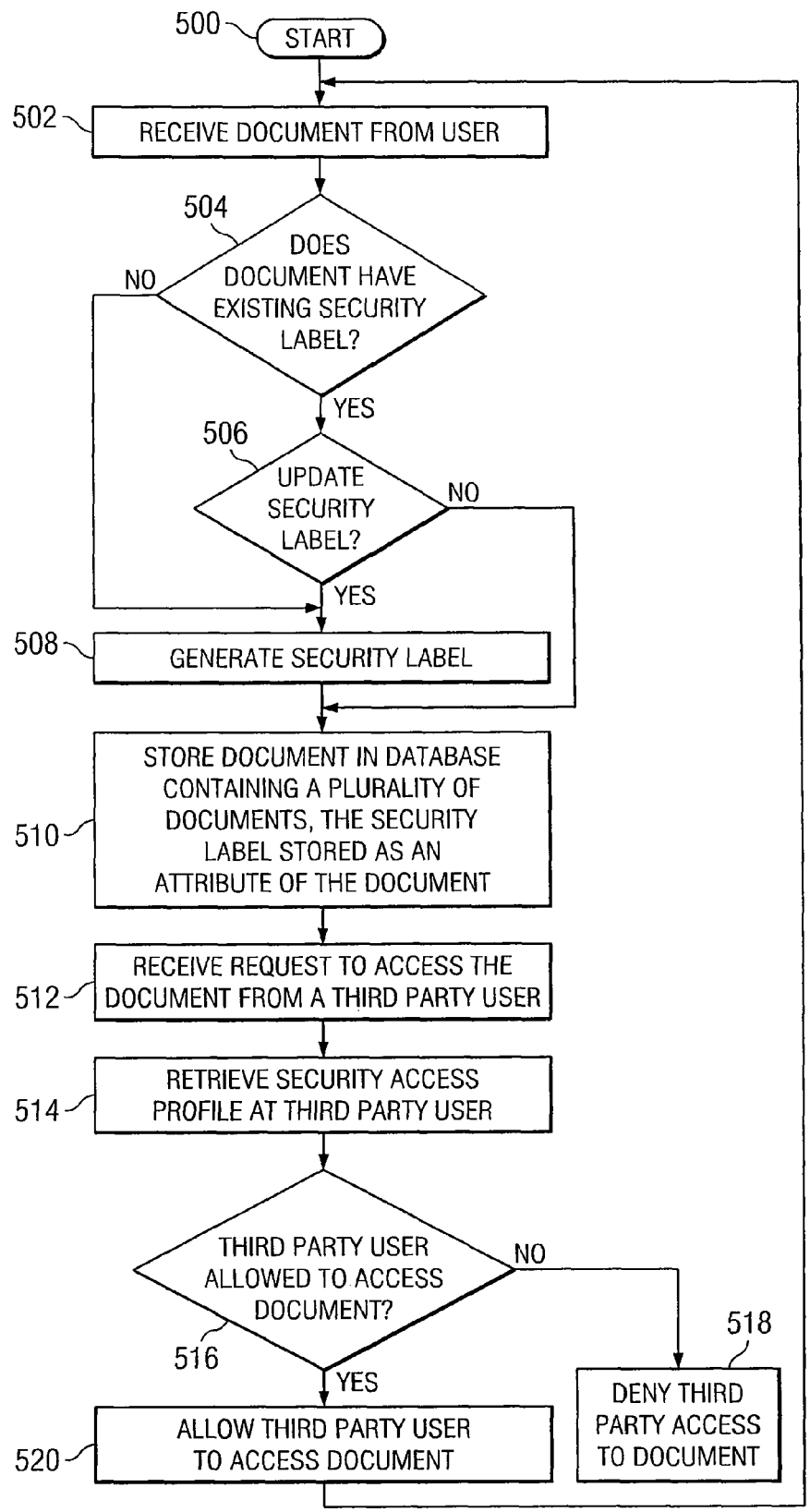
FIG. 5 illustrates an example method for providing secure document management (e.g., using the system illustrated in FIG. 1), according to certain embodiments of the present invention.

FIG. 5 illustrates an example method for providing secure document management (e.g., using system 100 illustrated in FIG. 1), according to certain embodiments of the present invention. At step 502, a document is received from a user 130. In this example, the user 130 requests to store the document in document repository 108. As described above, storing may include importing a document from outside the document management system, creating a new document within the document management system, or checking in a document existing in the document management system. At step 504, document management application 124 determines whether the document has an existing security label. For example, a document that is either a new document or an imported document may not have an existing security label, while a document that is being checked in may have an existing security label (e.g., created when the document was created or imported).

If a determination is made that the document the user 130 is requesting to store in the document repository 108 has an existing security label, the method continues to step 506 where a determination is made whether the security label will be updated. If the user 130 indicates that the security label is to be updated, the method proceeds to step 508, where a security label is generated for the document (as described in further detail below). If at step 506 the user 130 indicates that the security label does not need to be updated, the document is stored in document repository 108 (e.g., as a document 122) with the existing security label stored as an attribute of the document 122.

If a determination is made at step 504 that the document the user is requesting to store in document repository 108 does not have an existing security label, the method continues to step 508. At step 508, a security label is generated for the document. As described above in connection with FIG. 1, the security label may have one or more components (e.g., a clearance component, a secondary security component, and/or a handling component). Furthermore, one or more of the components of the security label that the user is able to select may be determined according to the group membership of the user. For example, a user may only select a clearance component corresponding to a clearance group to which the user belongs.

At step 510, the document having an associated security label is stored in document repository 108 (e.g., as a document 122). The security label may be stored as an attribute of the document 122.

At step 512, document management application 124 may receive a request from a third-party user 130 (e.g., another user 130 of a user system 102) to access the document 122. At step 514, document management application 124 may retrieve a security access profile 126 associated with the third-party user 130. As described above with respect to FIG. 1, the security access profile 126 of the third-party user 130 may indicate the various group memberships of the third-party user 130 and may be stored in document repository 108.

At step 516, document management application 124 determines whether the requesting third-party user 130 is authorized to access the document 122. In certain embodiments, the determination is made by comparing the accessed security access profile 126 of the third-party user 130 with the security label of the requested document 122. As a particular example, if the document 122 has a clearance component (secret) and a secondary security component (Dallas office), document management application 124 may determines that the third-party user 130 is authorized to access the document if the security access profile 126 of the third-party user 130 indicates that the third-party user 130 belongs to both the secret group and the Dallas office group. If document management application 124 determines that the third-party user 130 is not authorized to access the document 122, the method continues to step 518 where access to document 122 by the third-party user 130 is denied. If document management application 124 determines that the third-party user 130 is authorized to access the document 122, the method proceeds to step 520 where the third-party user 130 is allowed access to the document 122. Once allowed access to the document 122, the third-party user 130 may edit the document, as appropriate (i.e., unless certain privilege restriction specify otherwise). Once the third-party user 130 has completed editing the document 122, the method returns to step 502 with a request from the third-party user 130 to store the document 122 in document repository 108 (e.g., by checking in the document, as described above).

The methods described below with respect to FIGS. 6-11 contemplate that the functionality associated with the above-described document management system 100 is being provided by a Documentum content server/Webtop client interface system modified/supplemented as described above. As such, the steps of each of the methods are illustrated and described as being performed either by an administrator, a user, a Webtop client, or a Documentum database. Furthermore, it is understood that actions described below as being performed by the administrator may be performed by the administrator using an administrative system (such as administrative system 104 of system 100) and actions described below as being performed by the user may be performed by the user of a user system (such as user system 102 of system 100).

Figure 6:
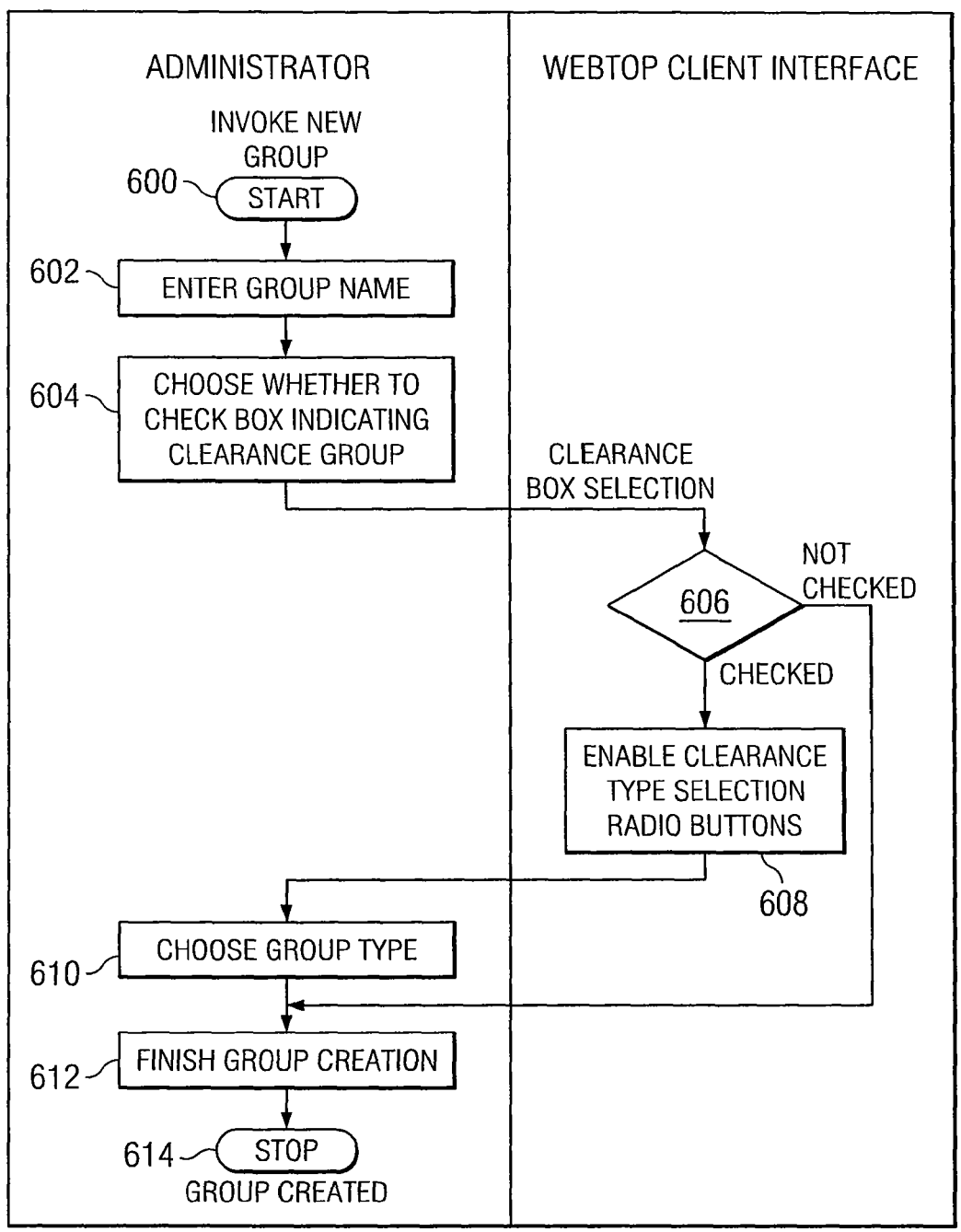
FIG. 6 illustrates an example method for an administrator to create a group in the system illustrated in FIG. 1, according to certain embodiments of the present invention.

FIG. 6 illustrates an example method for an administrator 132 to create a group in system 100 illustrated in FIG. 1, according to certain embodiments of the present invention. At step 600, the administrator may invoke the New Group Action, such as by selecting an appropriate tab and/or clicking an appropriate button. At step 602, administrator 132 may specify a group name for the new group being created.

At step 604, administrator 132 may select whether the group being created will be associated with a particular clearance group (e.g., a secondary security group) by choosing whether to check a box indicating that the group will be a clearance group. At step 606, the Webtop client interface may receive the selection from administrator 132. If administrator 132 selects to specify that the group is a clearance group, the method continues to step 608, where the Webtop client interface enables one or more buttons to be displayed to administrator 132. The buttons may indicate the various clearance groups available for selection by administrator 132 (e.g., top-secret, secret, and confidential).

At step 610, administrator 132 may select the desired clearance group process, and at step 612 administrator 132 may complete the creation of the group. For example, administrator 132 may be creating a secondary security group (Dallas office) within the top-secret clearance type. Therefore, administrator 132 may select the top-secret button at step 610 and finish the group creation at step 612 (e.g., by selecting a button indicating that the group creation is complete). The Dallas office secondary security group may be created at step 614. In certain embodiments, if administrator 132 had chosen not to specify that the group is a clearance group at step 604, the Webtop client interface may have proceeded directly to step 612 for administrator 132 to complete the group creation at step 606. For example, administrator 132 may be creating a group of users 130 for purposes other than designating what documents 122 that group may access (e.g., a project group). At step 614, the group is created.

Figure 7:
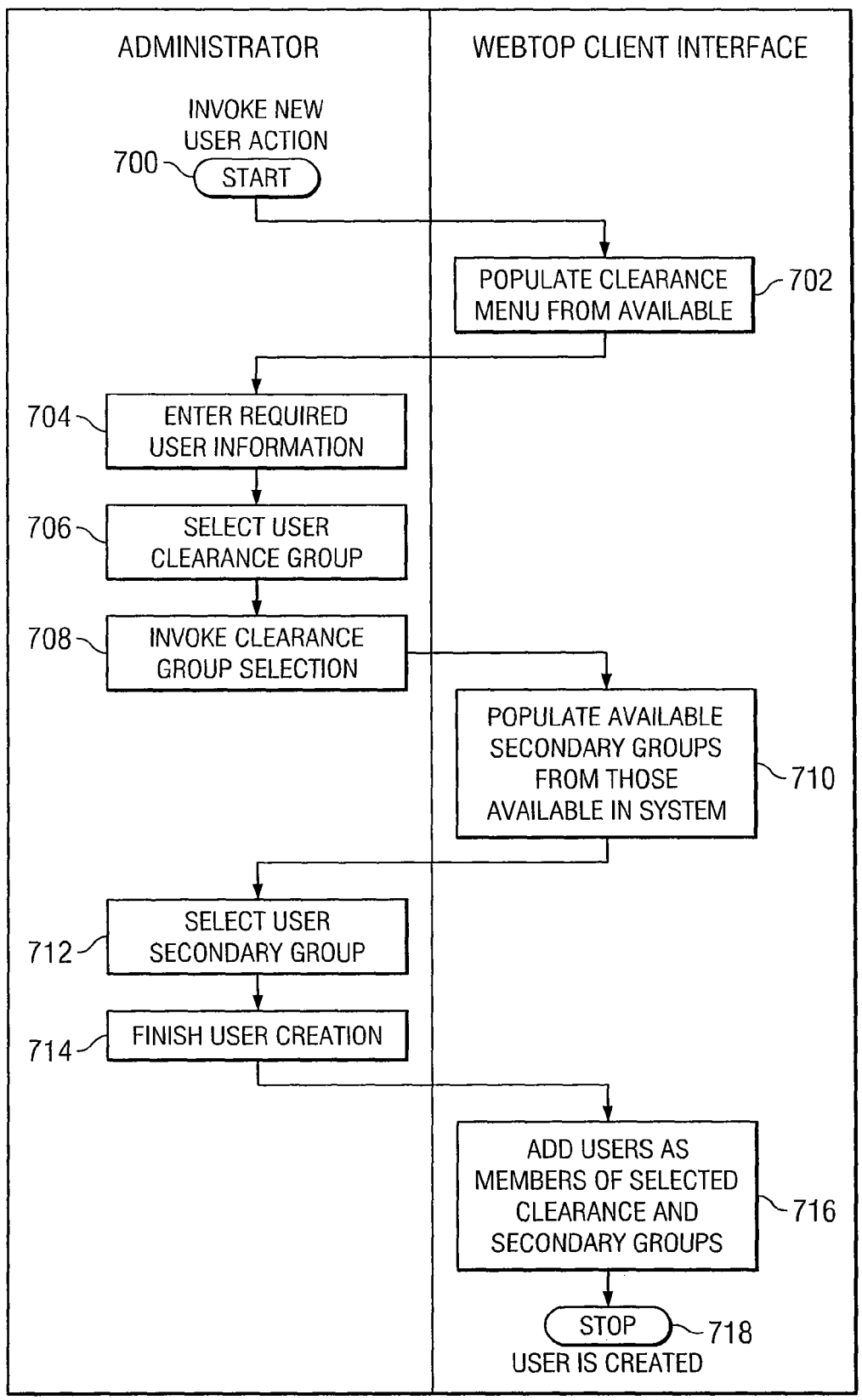
FIG. 7 illustrates an example method for an administrator to create a user in the system illustrated in FIG. 1, according to certain embodiments of the present invention.

FIG. 7 illustrates an example method for an administrator 132 to create a user 130 in the system 100 illustrated in FIG. 1, according to certain embodiments of the present invention. At step 700, administrator 132 may invoke the New Group Action, such as by selecting an appropriate tab selection.

At step 702, in response to the invocation of the new group action by administrator 132, the Webtop client interface may populate a menu of clearance groups available for selection by administrator 132. At step 704, administrator 132 may enter any appropriate information associated with the user 130 (e.g., name, location, telephone number, project group). At step 706, administrator 132 may select the clearance group for user 130 by selecting the appropriate group from the menu populated by the Webtop client interface at step 702. At step 708, administrator 132 may invoke the clearance group selection made in step 706, such as by selecting a button indicating that administrator 132 wishes to proceed.

At step 710, the Webtop client interface may populate menu including those secondary security groups available for the selected clearance group. At step 712, administrator 132 may select the appropriate secondary security group(s) from the menu provided by the Webtop client interface. At step 714, administrator 132 finishes the user creation, such a by selecting a button indicating that the process is complete. At step 716, the Webtop client interface adds the new user 130 to the selected clearance and secondary security groups (e.g., by adding a security access profile 126 associated with the new user 130 to document repositories 108, as described above in connection with FIG. 1). At step 718, the user 130 is created.

Figure 8:
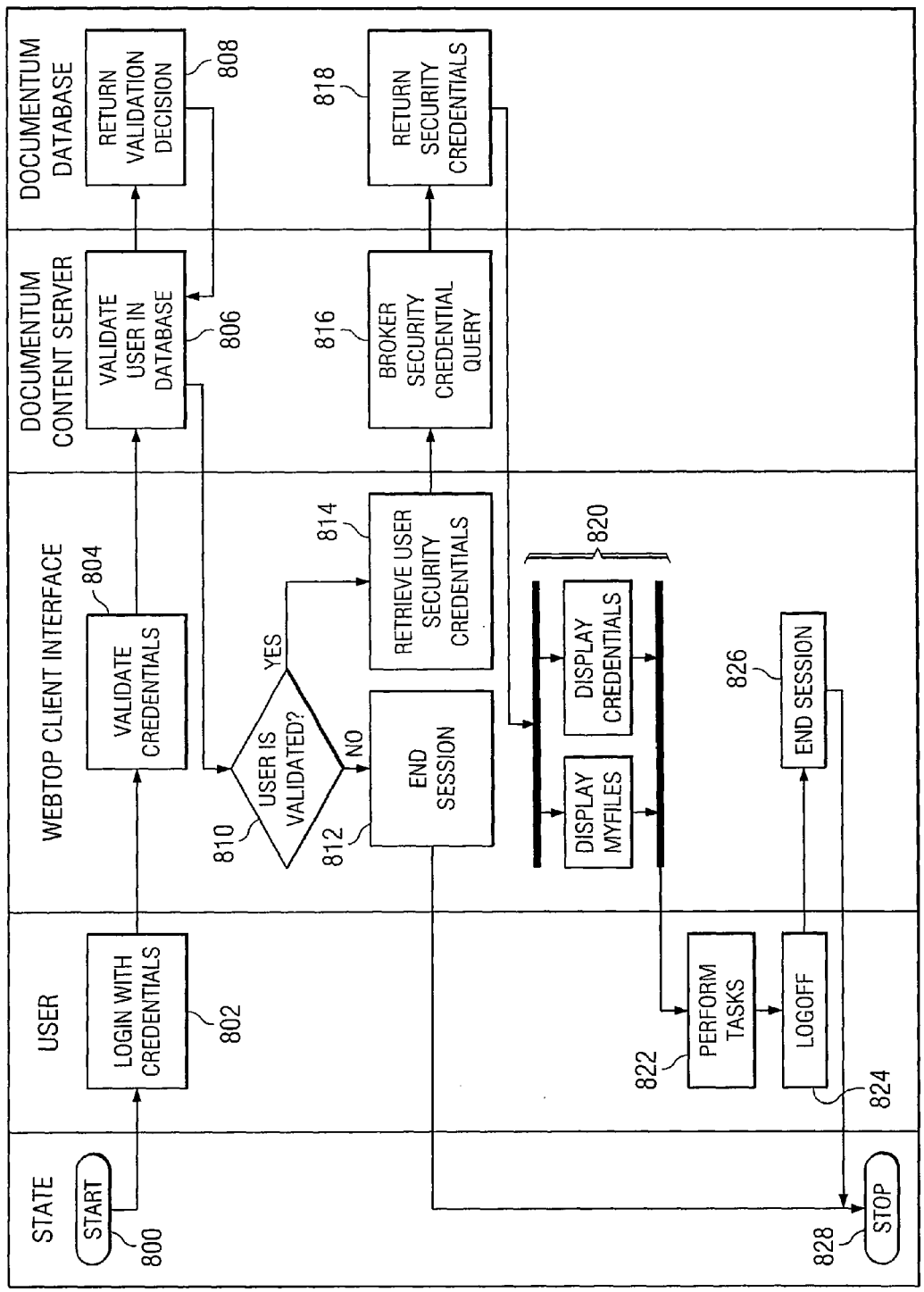
FIG. 8 illustrates an example method for a user to login/logout of system document management application, according to certain embodiments of the present invention.

FIG. 8 illustrates an example method for a user 130 to login/logout of system document management application 124, according to certain embodiments of the present invention. The method begins at step 800. At step 802, user 130 provides login credentials. In certain embodiments, the login credentials include a username and password; however, the present invention contemplates the use of any suitable login credentials. At step 804, the Webtop client interface validates the credentials provided by user 130 and communicates the credentials to the Documentum content server. At step 806, the Documentum content server validates that the set of credentials provided by user 130 correspond to a set of credentials in the document repository 108 for an authorized user. At step 808, the Documentum database returns a validation decision for the user.

At step 810, the Webtop client interface processes the received validation decision. If user 130 was not validated, at step 812 the Webtop client interface may end the session for the user 130. If user 130 was validated, the Webtop client may retrieve the security access profile for the user 130. For example, the Document content server may query the Documentum database (e.g., document repository 108) at step 816, and the Documentum database may return the security access profile 126 at step 818. Based on the returned security access profile 126 for user 130, at step 820 the Webtop client interface provides a display to user 130 of the group memberships of user 130 and the files belonging to user 130. At step 822, user 130 may perform any of a number of tasks. At step 824, user 130 logs off document management application 124, and at step 826 the session ends.

Figure 9:
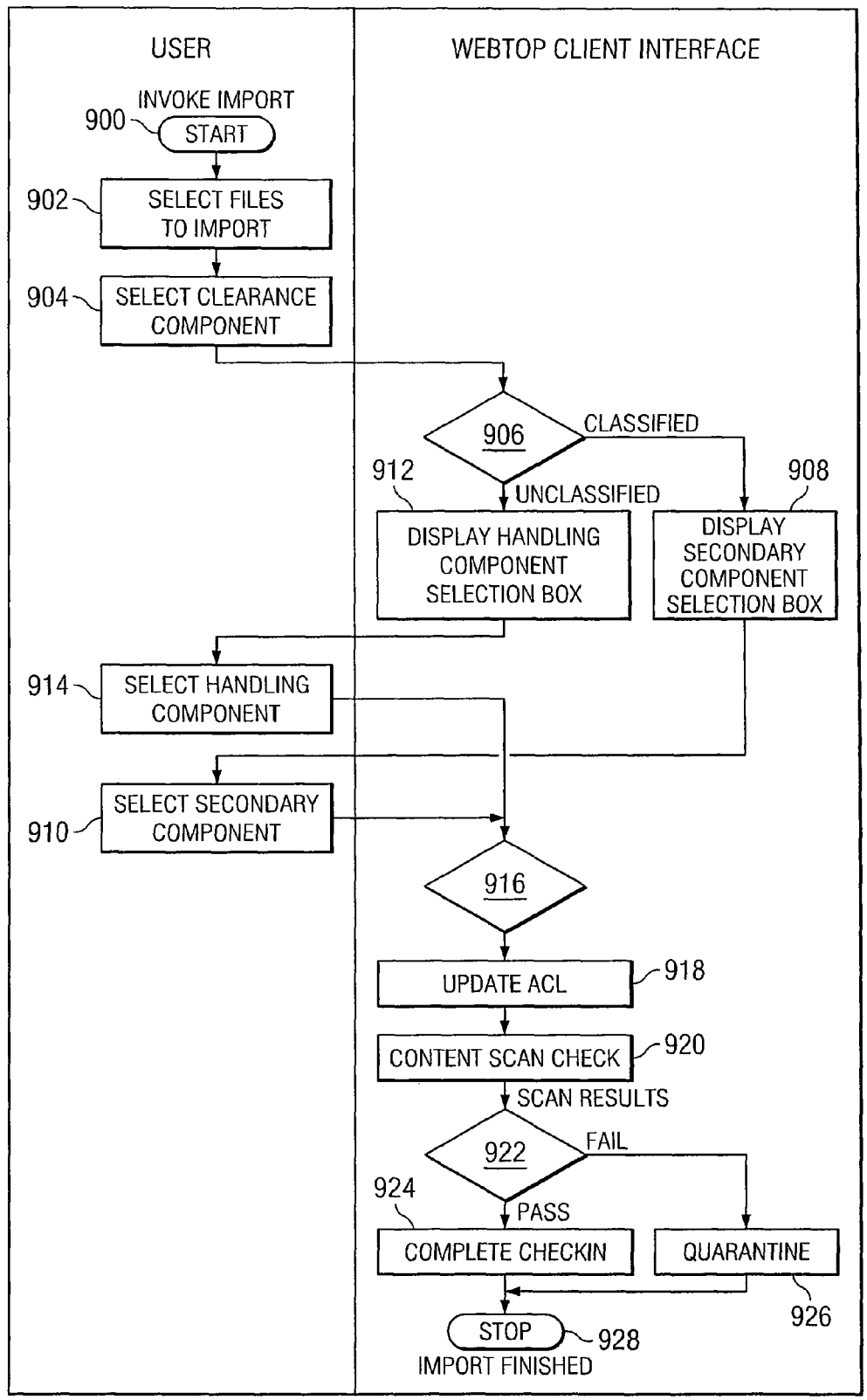
FIG. 9 illustrates an example method for a user to create a security label when importing an existing document into a document repository of the system, according to certain embodiments of the present invention.

FIG. 9 illustrates an example method for a user 130 to create a security label when importing an existing document into a document repository 108 of system 100, according to certain embodiments of the present invention. At step 900, user 130 invokes the import of a document. At step 902, user 130 selects the particular existing document sought to be stored on the Documentum database (e.g., document repository 108).

At step 904, user 130 selects the clearance component of the security label for the document. In certain embodiments, the user 130 is able to select from those clearance components corresponding to a clearance group to which the user 130 belongs. In certain embodiments, the clearance component may be either classified (e.g., top-secret, secret, or confidential) or unclassified.

At step 906, the Webtop client interface may receive the clearance group selection from user 130 and determines if the document sought to be imported will be classified or unclassified. If the document sought to be imported is classified (meaning, for example, that the clearance group selection made by the user 130 was top-secret, secret, or confidential), the method continues to step 908. At step 908, the Webtop client interface may populate a menu to display the available secondary security components for the security label for the chosen clearance component.

The available secondary security component may include those components corresponding to the secondary security groups to which the user 130 belongs, as well as a selection that no secondary security component be classified. For example, if the secret clearance component is chosen and the clearance component has three associated secondary security components (e.g., Dallas office, Washington office, and New York office) corresponding to three secondary security groups (Dallas office secondary security group, Washington office secondary security group, and New York office secondary security group), then the menu may include only those secondary security components corresponding to group to which the user 130 belongs. Thus, if user 130 belongs only to the Dallas office secondary security group, then the menu may include only a Dallas office secondary security component choice as well as a choice to leave the secondary security component unspecified.

At step 910, user 130 may select the desired secondary security component from the list of available secondary security components. If at step 906, the Webtop client component determines that the document sought to be imported is unclassified (e.g., if clearance component selection at step 904 was unclassified), the method may continue to step 912. At step 912, the Webtop client component may populate a menu of available handling components for the security label (e.g., proprietary). At step 914, user 130 may select the desired handling component. At step 916, the Webtop client component may receive either the secondary or handling components selections for the security label from user 130. At step 918, the Webtop client component may update an access control list (ACL) to reflect the information received from user 130.

At step 920, the Webtop client interface may scan the content of the document and compare the document content with the components of the security label provided by user 130. At step 922, the Webtop client component determines if the security label is appropriate based on the scan of the document contents. If the security label is appropriate, the method continues to step 924 where the check-in process in completed. If the security label is inappropriate, the method continues to step 926 where the document may be quarantined until a system administrator can check the document more thoroughly to ensure that the security label is appropriate for the document contents. At step 928, the import process is completed.

Figure 10:
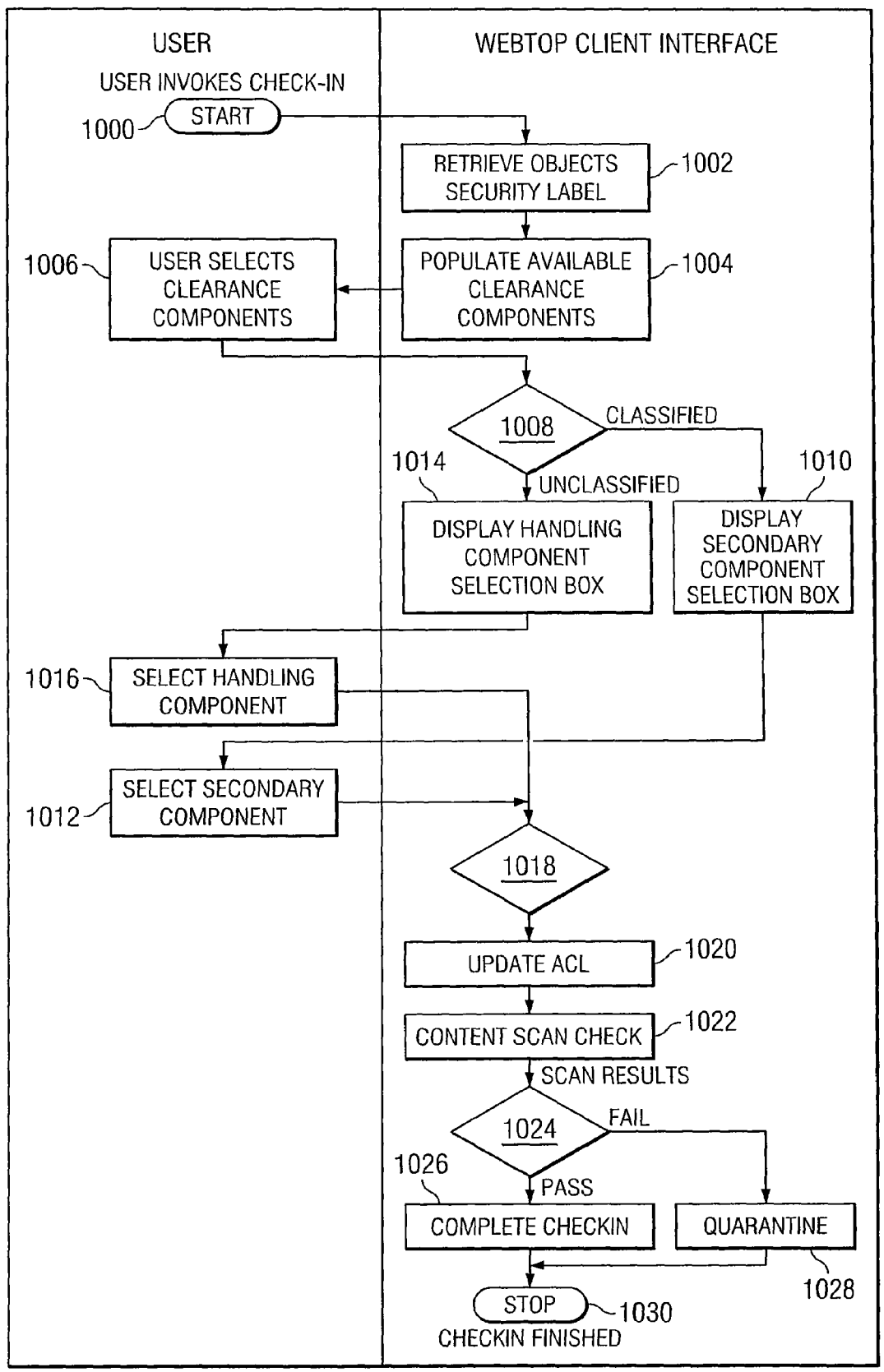
FIG. 10 illustrates an example method for a user to check a document into the document repository of the system, according to certain embodiments of the present invention.

FIG. 10 illustrates an example method for a user 130 to check a document into document repository 108 of system 100, according to certain embodiments of the present invention. The method begins at step 1000 with a user 130 invoking the document check-in operation. As an example, document check-in may occur when a user 130 checks out an existing document 122 stored in the Documentum database (document repository 108), edits the document 122, and then checks in the document 122 back into the Documentum database (document repository 108) as an updated version (or replacement) of the document 122 that was checked out. At step 1002, the Webtop client interface may retrieve the security label associated with the document 122 that was checked out. At step 1004, the Webtop client interface may populate a menu to include the possible clearance components for a new security label for the document 122 based on the clearance group memberships of the user 130 requesting to check in the document 122. At step 1006, the user 130 may select a clearance component for the document 122. Steps 1006 through 1030 are substantially similar to steps 904 to 928, described above with respect to FIG. 9.

Figure 11:
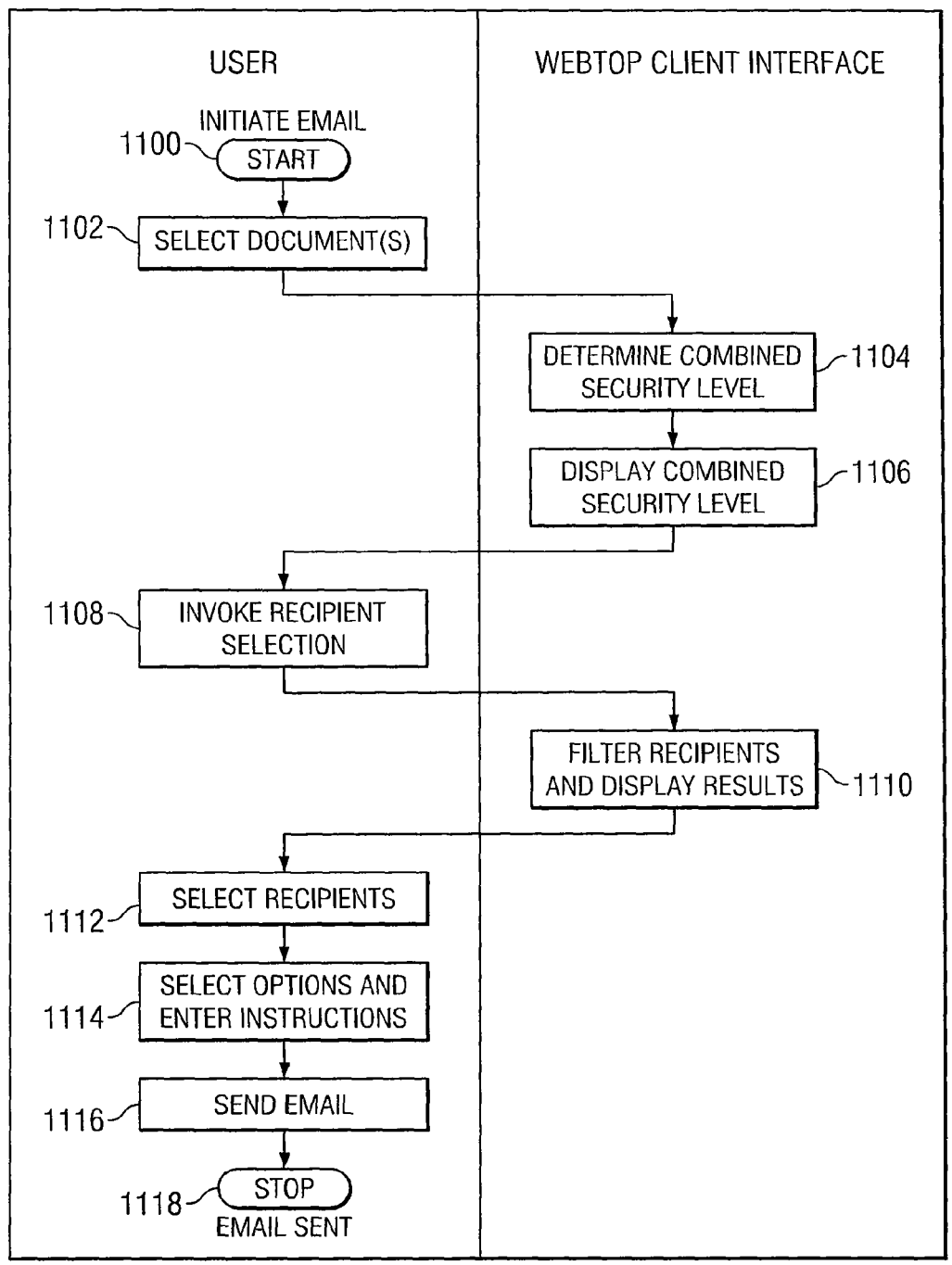
FIG. 11 illustrates an example method for a user to email a document stored in document repository to another user, according to certain embodiments of the present invention.

FIG. 11 illustrates an example method for a user 130 to email a document 122 stored in document repository 108 to another user 130, according to certain embodiments of the present invention. The method begins at step 1100 with the sending user 130 initiating an email. At step 1102, the sending user 130 selects one or more documents 130 from document repository 108 that the sending user 130 desires to attach to the email.

At step 1104, the Webtop client may determine the combined security level of the documents 122 selected. For example, the Webtop client component may determine the most restrictive security level for all of the documents 122 selected based on the security label associated with each of the selected documents 122. As a particular example, if user 130 selects two documents 122 to be attached to the email, the first document 122 having a security label with a top-secret clearance component and no secondary security component and the second document 122 having a security label with a secret clearance level and a Dallas secondary security component, the combined security level for the two documents 122 may be top-secret and Dallas office.

At step 1106, the Webtop client component may display the combined security level to user 130. At step 1108, user 130 may select the desired recipient users 130 of the email to which the selected documents 122 are to be attached. At step 1110, the Webtop client component may filter the recipient users 130 selected by the sending user 130 according to the combined security level of the documents 122 selected by the sending user 130 and display the results to the sending user 130. In the above-described example, the recipient users 130 who do not belong to both the top-secret clearance group and the Dallas office secondary security group may be filtered out as recipients. At step 1112, the sending user 130 may select those recipient users 130 from the filtered recipient list who the sending user 130 wants to receive the email to which the selected documents 122 are attached. At step 1114, the sending user 130 may select any additional instructions or options to be included in the email. At step 1116, the sending user 130 sends the email, such as by clicking a send button. At step 1118, the email is sent.

Although particular methods have been described with reference to FIGS. 6-11, the present invention contemplates any number of variations on these methods, according to particular needs. Thus, certain of the steps described with reference to FIGS. 6-11 may take place substantially simultaneously and/or in different orders than as shown and described. Moreover, components of system 100 may use methods with additional steps, fewer steps, and/or different steps, so long as the methods remain appropriate. Furthermore, although particular components of system 100 are described as performing particular steps of the methods described with reference to FIGS. 6-11, the present invention contemplates any suitable components of system 100 and/or components of other embodiments of the present invention performing the steps.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for providing secure document management, comprising:
    receiving a document from a user having an associated security access profile;
    generating a security label to be stored as an attribute of the document, the security label comprising:
        a clearance component selected from an authorized subset of a plurality of clearance components, the authorized subset of the plurality of clearance components determined based on the security access profile associated with the user; and
        a secondary security component selected from an authorized subset of a plurality of secondary security components, the authorized subset of the plurality of secondary security components determined based on the clearance component of the security label and the security access profile associated with the user;
    storing the document in a document repository storing a plurality of documents each having an associated security label;
    determining whether a third-party user is authorized access the document based on a comparison of a security access profile of the third-party user and the security label associated with the document;
    allowing, when a determination that the third-party user is authorized to access the document based on the comparison of the security access profile of the third-party user and the security label associated with the document, the third-party user to access the document:
    receiving an edited version of the document from the third-party user, the edited version of the document having an associated updated security label, the updated security label comprising:
        an updated clearance component selected from an authorized subset of a plurality of clearance components, the authorized subset of a plurality of clearance components determined based on the security access profile associated with the third-party user; and
        one or more updated secondary security components selected from a subset of a plurality of secondary security components, the subset of a plurality of secondary security components determined based on the updated clearance component of the updated security label and the security access profile associated with the third-party user; and
    storing the edited version of the document in the document repository storing the plurality of documents each having an associated security label.

2. The method of claim 1, wherein receiving the document from the user comprises receiving a newly-created document.

3. The method of claim 1, wherein receiving the document from the user comprises importing an existing document.

4. The method of claim 1, comprising:
    generating a first interface to be displayed to the user, the first interface comprising a clearance component field comprising one or more clearance components of the subset of authorized clearance components to the user;
    receiving from the user a selection of an authorized clearance component from the one or more clearance components of the subset of authorized clearance components;
    determining, in response to the selection of the clearance component of the security label by the user, the one or more authorized subsets of secondary security components from the plurality of secondary security components based on the selected clearance component of the security label and the security access profile associated with the user; and
    generating a second interface to be displayed to the user, the second interface comprising one or more secondary security component fields, each secondary security component field comprising one or more secondary security components of a subset of authorized secondary security components.

5. The method of claim 1, wherein the security label comprises an W1classified component, the unclassified component being independent of the security access profile of the user, the clearance component of the security label, and the one or more secondary security components of the security label.

6. The method of claim 1, comprising:
    scanning, upon receiving the document from the user, the content of the document; and
    comparing the content of the document to the security label associated with the document.

7. A system for providing secure document management, comprising: a document repository operable to store a plurality of documents each having an associated security label;
    one or more processing units comprising a computer processor operable to: receive a document from a user having an associated security access profile;
    generate a security label to be stored as an attribute of the document, the security label comprising:
        a clearance component selected from an authorized subset of a plurality of clearance components, the authorized subset of the plurality of clearance components determined based on the security access profile associated with the user; and
        a secondary security component selected from an authorized subset of a plurality of secondary security components, the authorized subset of the plurality of secondary security components determined based on the clearance component of the security label and the security access profile associated with the user;
    store the document in a document repository, which comprises memory, storing a plurality of documents each having an associated security label;
    determine whether a third-party user is authorized access the document based on a comparison of a security access profile of the third-party user and the security label associated with the document;
    allow, when a determination that the third-party user is authorized to access the document based on the comparison of the security access profile of the third-party user and the security label associated with the document, the third-party user to access the document;
    receive an edited version of the document from the third-party user, the edited version of the document having an associated updated security label, the updated security label comprising:
        an updated clearance component selected from an authorized subset of a plurality of clearance component, the authorized subset of a plurality of clearance components determined based on the security access profile associated with the third-party user; and
        one or more updated secondary security components selected from a subset of a plurality of secondary security components, the subset of a plurality of secondary security components determined based on the updated clearance component of the updated security label and the security access profile associated with the third-party user; and store the edited version of the document in the document repository storing the plurality of documents each having an associated security label.

8. The system of claim 7, wherein the document received from the user comprises a newly-created document.

9. The system of claim 7, wherein the receiving the document from the user comprises importing an existing document.

10. The system of claim 7, wherein the one or more processing units are operable to:
generate a first interface to be displayed to the user, the first interface comprising a clearance component field comprising one or more clearance components of the subset of authorized clearance components to the user;
receive from the user a selection of an authorized clearance component from the one or more clearance components of the subset of authorized clearance components;
determine, in response to the selection of the clearance component of the security label by the user, the one or more authorized subsets of secondary security components from the plurality of secondary security components based on the selected clearance component of the security label and the security access profile associated with the user; and
generate a second interface to be displayed to the user, the second interface comprising one or more secondary security component fields, each secondary security component field comprising one or more secondary security components of a subset of authorized secondary security components.

11. The system of claim 7, wherein the security label comprises an unclassified component, the unclassified component being independent of the security access profile of the user, the clearance component of the security label, and the one or more secondary security components of the security label.

12. The system of claim 7, wherein the one or more processing units are operable to:
scan, upon receiving the document from the user, the content of the document; and
compare the content of the document to the security label associated with the document.

13. An article, comprising:
a computer readable medium comprising non-transitory stored instructions that enable a machine to:
receive a document from a user having an associated security access profile;
generate a security label to be stored as an attribute of the document, the security label comprising:
a clearance component selected from an authorized subset of a plurality of clearance components, the authorized subset of the plurality of clearance components determined based on the security access profile associated with the user; and
a secondary security component selected from an authorized subset of a plurality of secondary security components, the authorized subset of the plurality of secondary security components determined based on the clearance component of the security label and the security access profile associated with the user;
store the document in a document repository storing a plurality of documents each having an associated security label;

determine whether a third-party user is authorized access the document based on a comparison of a security access profile of the third-party user and the security label associated with the document;
allow, when a determination that the third-party user is authorized to access the document based on the comparison of the security access profile of the third-party/user and the security label associated with the document, the third-party user to access the document;
receive an edited version of the document from the third-party user, the edited version of the document having an associated updated security label, the updated security label comprising:
an updated clearance component selected from an authorized subset of a plurality of clearance components, the authorized subset of a plurality of clearance components determined based on the security access profile associated with the third-party user; and
one or more updated secondary security components selected from a subset of a plurality of secondary security components, the subset of a plurality of secondary security components determined based on the updated clearance component of the updated security label and the security access profile associated with the third-party user; and
store the edited version of the document in the document repository storing the plurality of documents each having an associated security label.

14. The software of claim 13, wherein the document received from the user comprises one or more of:
a newly-created document; and an imported existing document.

15. The software of claim 13, operable to:
generate a first interface to be displayed to the user, the first interface comprising a clearance component field comprising one or more clearance components of the subset of authorized clearance components to the user;
receive from the user a selection of an authorized clearance component from the one or more clearance components of the subset of authorized clearance components;
determine, in response to the selection of the clearance component of the security label by the user, the one or more authorized subsets of secondary security components from the plurality of secondary security components based on the selected clearance component of the security label and the security access profile associated with the user; and
generate a second interface to be displayed to the user, the second interface comprising one or more secondary security component fields, each secondary security component field comprising one or more secondary security components of a subset of authorized secondary security components.

16. The software of claim 13, wherein the security label comprises an unclassified component, the unclassified component being independent of the security access profile of the user, the clearance component of the security label, and the one or more secondary security components of the security label.

17. The software of claim 13, operable to: scan, upon receiving the document from the user, the content of the document;
and
compare the content of the document to the security label associated with the document.

* * * * *

UNITED STATES PATENT AND TRADEMARK OFFICE
Certificate

Patent No. 8,234,693 B2                                            Patented: July 31, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Noah Z. Stahl, St. Petersburg, FL (US); Wendy S. Bartlett, Seminole, FL (US); Randall S. Brooks, Apollo Beach, FL (US); and Daniel Teijido, Clearwater, FL (US).

Signed and Sealed this Twenty-fifth Day of November 2014.

FARID HOMAYOUNMEHR
                                                                                                *Supervisory Patent Examiner*
                                                                                                         Art Unit 2495
                                                                                       Technology Center 2400